United States Patent

[11] 3,582,899

[72] Inventor Carl F. Semmelhaack
West Chester, Pa.

[21] Appl. No. 714,907
[22] Filed Mar. 21, 1968
[45] Patented June 1, 1971
[73] Assignee Burroughs Corporation
Detroit, Mich.

[54] METHOD AND APPARATUS FOR ROUTING DATA AMONG PROCESSING ELEMENTS OF AN ARRAY COMPUTER
3 Claims, 15 Drawing Figs.

[52] U.S. Cl. .......... 340/172.5
[51] Int. Cl. .......... G06f 3/04
[50] Field of Search .......... 235/157; 340/172.5

[56] References Cited

UNITED STATES PATENTS 3,228,005 1/1966 Delmege, Jr. et al. .......... 340/172.5
3,374,468 3/1968 Muir .......... 340/172.5

OTHER REFERENCES

Anacker, W. and Wang, C. P. " Data Distribution Channel for Multiprocessor Systems," in IBM Technical Disclosure Bulletin. Vol. 9 No. 9, Feb. 1967, pp. 1145— 1147.

*Primary Examiner*—Paul J. Henon
*Assistant Examiner*—Melvin B. Chapnick
*Attorney*—Carl Fissell, Jr.

ABSTRACT: An interconnection scheme for routing data word information among the processing elements of an array computer is described wherein the word length is larger than, equal to, or smaller than the number of processing elements in the array. When the word length is equal to the number of processing elements, each processing element first transmits all but one of the bits of the word stored in its routing register to the corresponding bit positions of the routing register of the correspondingly numbered processing elements, one bit per processing element. Next the contents of the routing registers of all the processing elements are shifted by the routing amount. In the last step, the first step is repeated. In situations in which the word length is smaller than the number of processing elements hardware is added to some of the processing elements or the processing elements may be grouped into a plurality of subarrays. If the word length is larger than the number of processing elements the bits are grouped so that the number of groups is equal to the number of processing elements.

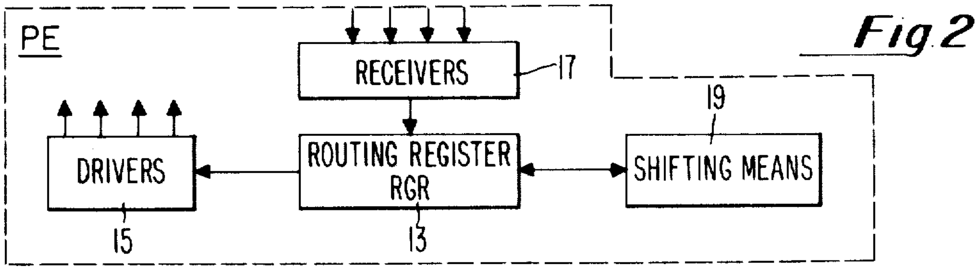
Fig 2
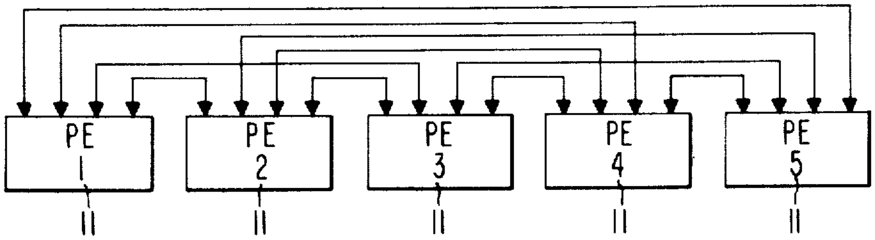
Fig 1
| BIT NOS. | | 1 | 2 | 3 | 4 | 5 |
|---|---|---|---|---|---|---|
| PROCESSING ELEMENTS | 1 | $A_1$ | $A_2$ | $A_3$ | $A_4$ | $A_5$ |
| | 2 | $B_1$ | $B_2$ | $B_3$ | $B_4$ | $B_5$ |
| | 3 | $C_1$ | $C_2$ | $C_3$ | $C_4$ | $C_5$ |
| | 4 | $D_1$ | $D_2$ | $D_3$ | $D_4$ | $D_5$ |
| | 5 | $E_1$ | $E_2$ | $E_3$ | $E_4$ | $E_5$ |
Fig 3
| BIT NOS. | | 1 | 2 | 3 | 4 | 5 |
|---|---|---|---|---|---|---|
| PROCESSING ELEMENTS | 1 | $A_1$ | $B_1$ | $C_1$ | $D_1$ | $E_1$ |
| | 2 | $A_2$ | $B_2$ | $C_2$ | $D_2$ | $E_2$ |
| | 3 | $A_3$ | $B_3$ | $C_3$ | $D_3$ | $E_3$ |
| | 4 | $A_4$ | $B_4$ | $C_4$ | $D_4$ | $E_4$ |
| | 5 | $A_5$ | $B_5$ | $C_5$ | $D_5$ | $E_5$ |
Fig 4
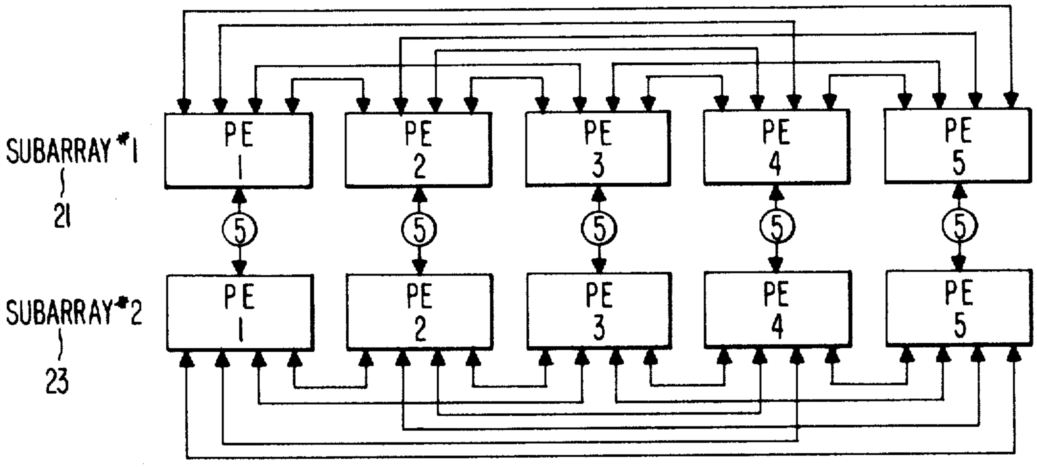
Fig 10
INVENTOR.
CARL F. SEMMELHAACK
BY Kevin C. McMahon
ATTORNEY

| BIT NOS. | | 1 | 2 | 3 | 4 | 5 |
|---|---|---|---|---|---|---|
| PROCESSING ELEMENTS | 1 | $C_1$ | $D_1$ | $E_1$ | $A_1$ | $B_1$ |
| | 2 | $C_2$ | $D_2$ | $E_2$ | $A_2$ | $B_2$ |
| | 3 | $C_3$ | $D_3$ | $E_3$ | $A_3$ | $B_3$ |
| | 4 | $C_4$ | $D_4$ | $E_4$ | $A_4$ | $B_4$ |
| | 5 | $C_5$ | $D_5$ | $E_5$ | $A_5$ | $B_5$ |

Fig.5

| BIT NOS. | | 1 | 2 | 3 | 4 | 5 |
|---|---|---|---|---|---|---|
| PROCESSING ELEMENTS | 1 | $C_1$ | $C_2$ | $C_3$ | $C_4$ | $C_5$ |
| | 2 | $D_1$ | $D_2$ | $D_3$ | $D_4$ | $D_5$ |
| | 3 | $E_1$ | $E_2$ | $E_3$ | $E_4$ | $E_5$ |
| | 4 | $A_1$ | $A_2$ | $A_3$ | $A_4$ | $A_5$ |
| | 5 | $B_1$ | $B_2$ | $B_3$ | $B_4$ | $B_5$ |

Fig.6

| BIT NOS. | | 1 | 2 | 3 | 4 | X | X |
|---|---|---|---|---|---|---|---|
| PROCESSING ELEMENTS | 1 | $A_1$ | $A_2$ | $A_3$ | $A_4$ | 0 | 0 |
| | 2 | $B_1$ | $B_2$ | $B_3$ | $B_4$ | 0 | 0 |
| | 3 | $C_1$ | $C_2$ | $C_3$ | $C_4$ | 0 | 0 |
| | 4 | $D_1$ | $D_2$ | $D_3$ | $D_4$ | 0 | 0 |
| | 5 | $E_1$ | $E_2$ | $E_3$ | $E_4$ | | |
| | 6 | $F_1$ | $F_2$ | $F_3$ | $F_4$ | | |

Fig.7

| BIT NOS. | | 1 | 2 | 3 | 4 | X | X |
|---|---|---|---|---|---|---|---|
| PROCESSING ELEMENTS | 1 | $E_1$ | $F_1$ | $A_1$ | $B_1$ | $C_1$ | $D_1$ |
| | 2 | $E_2$ | $F_2$ | $A_2$ | $B_2$ | $C_2$ | $D_2$ |
| | 3 | $E_3$ | $F_3$ | $A_3$ | $B_3$ | $C_3$ | $D_3$ |
| | 4 | $E_4$ | $F_4$ | $A_4$ | $B_4$ | $C_4$ | $D_4$ |
| | 5 | 0 | 0 | 0 | 0 | | |
| | 6 | 0 | 0 | 0 | 0 | | |

Fig.8

| BIT NOS. | | 1 | 2 | 3 | 4 | 5 |
|---|---|---|---|---|---|---|
| PROCESSING ELEMENTS | 1 | $A_1^1$ | $A_2^1$ | $A_3^1$ | $A_4^1$ | $A_5^1$ |
| | 2 | $B_1^1$ | $B_2^1$ | $B_3^1$ | $B_4^1$ | $B_5^1$ |
| | 3 | $C_1^1$ | $C_2^1$ | $C_3^1$ | $C_4^1$ | $C_5^1$ |
| | 4 | $D_1^1$ | $D_2^1$ | $D_3^1$ | $D_4^1$ | $D_5^1$ |
| | 5 | $E_1^1$ | $E_2^1$ | $E_3^1$ | $E_4^1$ | $E_5^1$ |

21

Fig.9A

23

| BIT NOS. | | 1 | 2 | 3 | 4 | 5 |
|---|---|---|---|---|---|---|
| PROCESSING ELEMENTS | 1 | $A_1^2$ | $A_2^2$ | $A_3^2$ | $A_4^2$ | $A_5^2$ |
| | 2 | $B_1^2$ | $B_2^2$ | $B_3^2$ | $B_4^2$ | $B_5^2$ |
| | 3 | $C_1^2$ | $C_2^2$ | $C_3^2$ | $C_4^2$ | $C_5^2$ |
| | 4 | $D_1^2$ | $D_2^2$ | $D_3^2$ | $D_4^2$ | $D_5^2$ |
| | 5 | $E_1^2$ | $E_2^2$ | $E_3^2$ | $E_4^2$ | $E_5^2$ |

Fig.9B

INVENTOR.
CARL F. SEMMELHAACK
BY Kevin C. McMahon
ATTORNEY

| BIT NOS. | 1 | 2 | 3 | 4 | 5 |
|---|---|---|---|---|---|
| PROCESSING ELEMENT 1 | $A_1^1$ | $A_2^1$ | $A_3^1$ | $A_4^1$ | $A_5^1$ |
| 2 | $B_1^1$ | $B_2^1$ | $B_3^1$ | $B_4^1$ | $B_5^1$ |
| 3 | $C_1^1$ | $C_2^1$ | $C_3^1$ | $C_4^1$ | $C_5^1$ |
| 4 | $D_1^1$ | $D_2^1$ | $D_3^1$ | $D_4^1$ | $D_5^1$ |
| 5 | $E_1^2$ | $E_2^2$ | $E_3^2$ | $E_4^2$ | $E_5^2$ |

21

Fig. 11A

23

| BIT NOS. | 1 | 2 | 3 | 4 | 5 |
|---|---|---|---|---|---|
| PROCESSING ELEMENT 1 | $A_1^2$ | $A_2^2$ | $A_3^2$ | $A_4^2$ | $A_5^2$ |
| 2 | $B_1^2$ | $B_2^2$ | $B_3^2$ | $B_4^2$ | $B_5^2$ |
| 3 | $C_1^2$ | $C_2^2$ | $C_3^2$ | $C_4^2$ | $C_5^2$ |
| 4 | $D_1^2$ | $D_2^2$ | $D_3^2$ | $D_4^2$ | $D_5^2$ |
| 5 | $E_1^1$ | $E_2^1$ | $E_3^1$ | $E_4^1$ | $E_5^1$ |

Fig. 11B

| BIT NOS. | 1 | 2 | 3 | 4 | 5 | 6 | 7 | 8 | 9 | 10 |
|---|---|---|---|---|---|---|---|---|---|---|
| PROCESSING ELEMENT 1 | $A_1$ | $A_2$ | $A_3$ | $A_4$ | $A_5$ | $A_6$ | $A_7$ | $A_8$ | $A_9$ | $A_{10}$ |
| 2 | $B_1$ | $B_2$ | $B_3$ | $B_4$ | $B_5$ | $B_6$ | $B_7$ | $B_8$ | $B_9$ | $B_{10}$ |
| 3 | $C_1$ | $C_2$ | $C_3$ | $C_4$ | $C_5$ | $C_6$ | $C_7$ | $C_8$ | $C_9$ | $C_{10}$ |
| 4 | $D_1$ | $D_2$ | $D_3$ | $D_4$ | $D_5$ | $D_6$ | $D_7$ | $D_8$ | $D_9$ | $D_{10}$ |
| 5 | $E_1$ | $E_2$ | $E_3$ | $E_4$ | $E_5$ | $E_6$ | $E_7$ | $E_8$ | $E_9$ | $E_{10}$ |

Fig. 12

| BIT NOS. | 1 | 2 | 3 | 4 | 5 | 6 | 7 | 8 | 9 | 10 |
|---|---|---|---|---|---|---|---|---|---|---|
| PROCESSING ELEMENT 1 | $A_1$ | $A_2$ | $B_1$ | $B_2$ | $C_1$ | $C_2$ | $D_1$ | $D_2$ | $E_1$ | $E_2$ |
| 2 | $A_3$ | $A_4$ | $B_3$ | $B_4$ | $C_3$ | $C_4$ | $D_3$ | $D_4$ | $E_3$ | $E_4$ |
| 3 | $A_5$ | $A_6$ | $B_5$ | $B_6$ | $C_5$ | $C_6$ | $D_5$ | $D_6$ | $E_5$ | $E_6$ |
| 4 | $A_7$ | $A_8$ | $B_7$ | $B_8$ | $C_7$ | $C_8$ | $D_7$ | $D_8$ | $E_7$ | $E_8$ |
| 5 | $A_9$ | $A_{10}$ | $B_9$ | $B_{10}$ | $C_9$ | $C_{10}$ | $D_9$ | $D_{10}$ | $E_9$ | $E_{10}$ |

Fig. 13

*INVENTOR.*
CARL F. SEMMELHAACK
BY Kevin C. McMahon
ATTORNEY

METHOD AND APPARATUS FOR ROUTING DATA AMONG PROCESSING ELEMENTS OF AN ARRAY COMPUTER

BACKGROUND OF THE INVENTION

This invention relates to an improved interconnection system for routing data among the processing elements of an array computer.

For many classes of problems handled by computers today it has been found that several repetitive loops of the same instruction string are executed on different and independent data blocks for each loop. Attempts have been made in the past to take advantage of this parallelism by recognizing that a computer may be divided into a control section and a processing section and by providing an array of processing elements under the control of a single central control unit. Such a system is disclosed in the following three related patents:

| | |
|---|---|
| 3,287,702 | W. C. Borck, Jr. et al. |
| 3,287,703 | D. L. Slotnick |
| 3,312,943 | G. T. McKindles et al. |

Although the systems disclosed in the above-identified patents use parallel processing to speed data throughout, many problems still exist.

A greatly improved array computer system is taught in U.S. Pat. application No. 692,186 filed on Dec. 20, 1967 by Richard A. Stokes et al. and assigned to the assignee of the present invention. This system disclosed the use of four control units, each controlling the operation of separate quadrants of 64 processing elements. In operation the control units may operate independently on different problems or two or more control units may operate in unison on a single problem. In the latter case, the processing elements of these quadrants operate as a single multiquadrant array. In this way the size of the array may be adjusted to meet the needs of the particular problems and the system is able to operate more efficiently.

In both of the above systems the data can be routed among processing elements under the control of the associated control unit.

In routing data, the contents of a register in each of the processing elements is transferred to a higher or a lower numbered processing element. The number of processing elements by which the data is transferred is called the routing distance or routing amount.

In the above systems data words may be routed among the processing elements under the control of the control unit to their +8, −8, +1 and −1 neighbors. If it is desired to route data by a number of processing elements, other than these, it is necessary to do it in repetitive steps of +—8, −8, +1 or −1. The time required to perform these multiple step routes may be quite significant especially in the Stokes et al. system in which the route may be as many as 128 processing elements. In solving may problems this relatively large amount of time required for routing data among the processing elements substantially decreases the operational efficiency of the system.

OBJECTS AND SUMMARY OF THE INVENTION

It is therefore an object of the invention to improve the routing of data among the processing elements of array computers.

It is a further object of this invention to provide an array computer in which data may be routed by any number of processing elements in the same amount of time.

A still further object of this invention is to improve the routing in an array computer system so that data may be routed by any number of processing elements in the array in the same number of steps.

In carrying out these and other objects of this invention there is provided an improved interconnection system for routing M-bit words among the processing elements of an N processing element array, comprising register means in each of the processing elements for storing a word to be routed to another processing element during a route, the means in at least M of said processing elements being at least N bits long, means for transferring the bits in said register means, one each, all but one of the bits from a processing element's register means to receiving bit positions in the other processing element's register means, each of said receiving bit positions having a significance in the receiving register means corresponding to the number in the processing element array of the transferor processing element from which the particular bit is transferred, and means within 1 through M processing elements for shifting the bits of said register means by the route distance. During each transfer operation, one particular bit is not transferred since its destination is just the same particular significant position in transferor register, i.e. the position in which that bit already resides.

Various other objects and advantages and features of this invention will become more fully apparent from the following specification with its appended claims and accompanying drawings in which:

BRIEF DESCRIPTION OF THE DRAWINGS

FIG. 1 shows a five processing element array with the interconnections necessary for routing of data in accordance with this invention;

FIG. 2 is a schematic diagram of the portions of a processing element which may be used for routing of data;

FIG. 3 shows the arrangement of bits within routing registers of the elements of FIG. 1 before a routing operation;

FIG. 4 shows the arrangement of the bits within the processing elements of FIG. 1 after the rows and columns have been transposed;

FIG. 5 shows the arrangement of bits within the processing element after the bits have been shifted by the routing amount;

FIG. 6 shows the arrangement of bits within the processing element array at the end of the routing operation;

FIG. 7 shows the arrangement of bits before a routing operation in an array of processing elements having a word length shorter than the number of processing elements FIG. 8 shows the arrangement of bits of the array of FIG. 7 during the routing operations;

FIGS. 9A and 9B show the arrangement of bits in an array of processing elements made up of two subarrays before the routing operation according to the invention;

FIG. 10 shows the interconnections necessary for routing data in a 10-processing element array including two subarrays;

FIGS. 11A and 11B show the arrangement of bits in the array of FIG. 9 during a routing operation performed according to the invention;

FIG. 12 shows the arrangement of bits in an array in which the word length is longer than the number of processing elements;

FIG. 13 shows the arrangement of bits in the array of FIG. 12 at a point during a routing operation.

DETAILED DESCRIPTION

This invention can best be understood by referring to the following detailed description of the illustrated embodiments. In the following description the bits within the routing register of the processing elements (PE's) at the beginning of the route operation are designated by capital letters with a different letter being used for each PE. The subscript associated with the letters indicates the position of the bit within the register at the start of the routing operation and the superscript indicates the number of the subarray in which the bit appears at the beginning of the routing operation. The system for which the present invention is adapted is disclosed in the above-referred-to Stokes et al. application. The processing elements or execution units are of a type disclosed therein as are the particular registers which may be of a kind well known in the art.

Referring to FIG. 1 of the drawings there is illustrated an array of five PE's'' each having a word length of five bits. Each PE[11] is coupled by means of bidirectional 1-bit wide paths to each of the other PE's[11] of the array for accomplishing the routing of data among them.

The portions of the PE's[11] which may be used for the routing of data are illustrated in FIG. 2 of the drawings. The word to be routed to another PE[11] is stored in the Routing Register 13 (RGR[13]). The route is performed in three steps. First, four of the five bits of the word in RGR[13] are transferred, one each to the other PE's[11] of the array through the Drivers[15] and a bit is received from each of the other four PE's[11] of the array by RGR[13] through the Receivers[17]. During the second step the bits of RGR[13] are shifted by the route amount or routing distance by the Shifting Means[19] which may be a barrel switch or a shift register. In the final step of the routing operation of the first step is repeated, namely, four of the five bits in each register are transferred, one each, to the routing registers of the other PE's[11].

The respective Drivers [15] and Receivers [17] are transistor circuits for generating and amplifying signals as would be understood by one skilled in the art. Shifting means [19] may be of the type disclosed in Muir Pat. No. 3,374,468.

The mechanics of routing words according to the invention among the PE's[11] of FIG. 1 are discussed in more detail in relation to FIGS. 3 through 6. In FIG. 3 the contents of the RGR's[13] of each of the PE's[11] are arranged in a matrix with the PE's[11] being listed vertically and the bit numbers within the RGR's[13] of each of the PE's[11] being listed horizontally.

Initially the "A" word is in the first PE (1), the "B" word is in the second PE (2), the "C" word in the third PE (3), the "D" word in the fourth PE (4) and the "E" word in the fifth PE (5). In the first step of the routing operation each of the PE's[11] sends four of the bits in its RGR[13], one each to the other PE's[11] in such a way that the rows and columns of bits within the matrix of RGR's[13] are transposed as shown in FIG. 4. The first PE leaves the first bit in its RGR[13] unchanged and sends the second, third, fourth and fifth bits to the first bit position of the RGR's[13] of the second, third, fourth and fifth PE's[11] respectively.

In like manner the second PE sends the first bit from its RGR[13] to the second bit position of the RGR[13] of the first PE, leaves the second bit unchanged and sends the third, fourth and fifth bits of its RGR[13] to the second bit position of the RGR's[13] of the third, fourth and fifth PE's[11] respectively. The third, fourth and fifth PE's[11] also send four of the five bits of their RGR's[13] to the third, fourth, fifth bit positions respectively of the RGR's[13] of the other PE's[11].

In the second step of the routing operation the bits in each of the RGR's[13] are shifted end around by the routing distance in the Shifting Means[19] which may be a barrel switch or a shift register. FIG. 5 shows the result of this shift for a route of either +3 or −2. In a positive route the bits are shifted to the right end-around, whereas in a negative route the bits are shifted to the left end-around.

In the last step of the routing operation the first step is repeated, as has been explained above, thereby transposing the rows and columns of the matrix of FIG. 5 so that the matrix of FIG. 6 results. The result of the route is that the words in the RGR's[13] are routed a distance of +3 or −2.

In the manner described above, the bits in the RGR's[13] of any size array of PE's[11] may be routed by any number of PE's[11] provided that there are the same number of bits per word as there are PE's[11]. This scheme of routing may be generalized to nonsquare matrices, i.e., where there are a greater or lesser number of bits per word than there are PE's[11] in the array and also to where there are a plurality of arrays of PE's[11] such as in the Stokes et al. application, Ser. No. 692,186.

The application of the routing scheme of this invention to an array of PE's[11] in which the word length is shorter than the number of PE's[11] is now discussed in relation to FIGS. 7 and 8 of the drawings.

FIG. 7 illustrates a system having an array of six PE's[11] and word length of four bits. In a situation such as the routing scheme of the invention may be used if the routing portions of a number of the PE's[11], at least equal to the word length, can handle words having a bit length equal to the number of PE's[11] in the array. Applied to the array of FIG. 7, this means that at least four of the PE's[11] must have Drivers [15], Receivers[17], RGR's[13] and Shifting Means[19] that are six bits wide.

The routing of words among the PE's[11] of FIG. 7 may then be accomplished in exactly the same manner as it was in the system of FIG. 3. If the RGR's[13] of the PE's[11] are arranged as a matrix with two columns being empty as indicated by the "0"'s in FIG. 7, the rows and columns may be transposed exactly as was discussed in relation to FIG. 4. This transposition leaves two of the rows vacant.

The contents of the RGR's[13] of the four PE's[11] having bits in their RGR's[13] are then shifted to the right or to the left by the route amount or distance as illustrated in FIG. 8. Finally the first step is repeated as was described above and the rows and columns are once again transposed, thereby completing the routing operation.

Another method of routing words among the PE's[11] of an array in which the number of PE's[11] is larger than the bit lengths of the word is illustrated in FIGS. 9, 10 and 11 of the drawings. This method is especially useful in systems having a plurality of subarrays of PE's[11] operating as a single array such as that disclosed in the Stokes et al. application mentioned above.

An array of PE's[11] in which the word length is smaller than the number of PE's[11] may also be divided into a plurality of subarrays, each having a number of PE's[11] equal to the word length. Such an arrangement is illustrated in FIGS. 9A and 9B of the drawings in which the PE array having a 5-bit word length is divided into first and second subarrays 21 and 23 each consisting of five PE's[11]. FIGS. 9A and 9B represent an array of ten PE's[11] that have been divided into two subarrays of five PE's[11] each. Corresponding PE's[11] of each subarray have been coupled to one another as illustrated in FIG. 10. The example given below is for the case of transferring a 5-bit word from the fifth PE[11] of the second subarray to the first PE[11] of the first subarray.

In routing data among the PE's[11] of this two part array some of the words cross from one subarray to the other. In any route operation the same words are transferred from the first subarray 21 to the second subarray 23 as are transferred from the second subarray 23 to the first subarray 21. For example, on a route of −2, the "A" and the "B" words of each subarray are transferred to the other subarray.

The routing operation may be accomplished according to the invention in an array made up of two subarrays by interchanging or swapping the words which are transferred between the subarrays and proceeding to route the words within each subarray as was described in relation to FIGS. 3 through 6. In order to accomplish this the PE's[11] of each subarray are connected to the corresponding PE[11] in the other subarray by a bidirectional 5-bit wide path as illustrated in FIG. 10 of the drawings.

A +1 route for the system illustrated in FIGS. 9 and 10 of the drawings is described in relation to FIGS. 11A and 11B of the drawings. In the +1 route the words in PE 5 of each of the subarrays, the "E" words, are routed to the other subarray. This route may be accomplished by first swapping the "E" words as shown in FIGS. 11A and 11B. After this the +1 route is accomplished in each of the subarrays in exactly the same manner as was described in relation to FIGS. 3 through 6 of the drawings. This +1 route results in the "E" word being in the RGR[13] of PE 1 in each of the subarrays.

In systems having more than two subarrays the same words in each subarray cross to the next higher or lower numbered subarray during the routing operation in an end-around fashion. Words may be routed in accordance with the invention in this situation by first transferring the words that cross to the next higher or lower number subarray to the corresponding PE's[11] of the respective subarray and then proceeding to perform the route within the subarrays.

If there are a greater number of bits per word than there are PE's[11] in the array it is possible to route the words among the PE's[11] according to the invention by grouping the bits so that there are the same number of equal groups as there are PE's[11] in the array. This is illustrated in FIGS. 12 and 13 of the drawings in relation to a five PE[11] array having a 10-bit word length. In this case the bits in the word may be grouped into five 2-bit pairs and the route may be performed on the groups as described in relation to FIGS. 3 through 6. The rows and columns of the array of groups are first transposed as illustrated in FIG. 13 of the drawings. Next the bits are shifted by two times the route amount in the Shifting means[19]. Finally the first step is repeated and the rows and columns of groups are again transposed in a manner described above in relation to FIGS. 3—6. In the case illustrated by FIGS. 11 and 12, the respective bit positions of each of the routing registers must be connected to one another to achieve the desired bit transfers. For example: bit position 1 of the second PE is connected to bit position 3 of the first PE; bit position 2 of the second PE is connected to bit position 4 of the first PE; and so on.

The bits may be handled in larger groups than illustrated in FIGS. 12 and 13 if the ratio between the word length and the number of PE's is larger than two. In each case the shift is equal to the route amount times the number of bits per group. If the number of bits in the word is not an even multiple of the number of PE's[11] in the array the situation may be handled in the same way as was described in relation to FIGS. 7 and 8 of the drawings with some of the groups being empty.

The transposition of the rows and columns of the matrix formed by the contents of the RGR's[13] of the PE's[11] may also be of interest to the programmer quite separately from its usefulness in the routing of words among the PE's[11]. This is especially true in applications where the bits or groups of bits may have separate significance of their own and not just as part of a word.

The above description of the illustrated embodiments of the invention has been by way of example only and should not be taken as a limitation on the scope of the invention.

What I claim is:

1. Apparatus for routing M-bit words among processing elements of a processing element array, said array being composed of a plurality of subarrays, said subarrays each having a number of processing elements $\geq M$, where each processing element of a subarray is coupled to correspondingly numbered processing elements in the other subarrays, said apparatus comprising:

- register means within each of the processing elements for storing the word to be routed to another processing element and for then storing the word received from another processing element during a route, said register means in at least M of said processing elements, in each subarray, being at least as long as the number of processing elements in the subarray,
- means for transferring the words that cross to the next higher or lower number subarray during a routing operation to the register means of the corresponding processing element in the transferee subarray in the case of a negative route, and to the register means of the processing element which is the corresponding distance from the end of the transferee subarray in the case of a positive route,
- means for transferring, within said subarrays, all but one of the bits from a processing element's register means to receiving bit positions in the other processing element-s'register means in the corresponding subarray, each of said receiving bit positions having a significance in the receiving register means corresponding to the number in the processing element subarray of the transferor processing element, and
- means within M of said processing elements in each subarray for shifting, subsequent to a transfer, the bits in each register means by an amount corresponding to the processing element, to which, said bits are to be routed.

2. Apparatus for routing M-bit words among processing elements of an N processing element array where $M \geq N$ comprising:

- register means in each of said processing elements for storing words to be routed to another processing element and then for storing the word received from another processing element during a routing operation,
- means for transferring all groups of bits, except one group, from each of the processing elements' register means to receiving group positions in the other processing elements' register means, each of said receiving group positions having a significance in the receiving register means corresponding to the number in the processing element array of the transferor processing element, and
- means within said processing elements for shifting, subsequent to a transfer, the bits in said register means by a multiple of N times an amount corresponding to the processing element, to which, said bits are to be routed, said multiple being equal to the number of bits in each of said groups.

3. A method for routing M-bit words from register means in each processing element of a processing element array, by a selected uniform number of processing elements to the register means of a higher or lower numbered processing element in the array, said array being composed of a plurality of subarrays, said subarrays each having a number of processing elements M where each processing element of a subarray is coupled to correspondingly numbered processing elements in the other subarrays, said method, comprising the steps of:

- transferring the words that cross to the next higher or lower numbered subarray during the routing operation to the register means of the corresponding processing element in the transferee subarray in the case of a negative route, and to the register means of the processing element which is the corresponding distance from the end of the transferee subarray in the case of a positive route,
- transferring, within said subarrays, all but one of the bits from a processing element's register means to receiving bit positions in the other processing elements' register means in the corresponding subarray, each of said receiving bit positions having a significance in the receiving register means corresponding to the number in the processing element subarray of the transferor processing element,
- subsequently shifting the bits of each register means by an amount corresponding to the processing element, to which, said bits are to be routed, and
- repeating the second step of the method.

PO-1050
(5/69)

UNITED STATES PATENT OFFICE
CERTIFICATE OF CORRECTION

Patent No. 3,582,899 Dated June 1, 1971

Inventor(s) Carl F. Semmelhaack

It is certified that error appears in the above-identified patent and that said Letters Patent are hereby corrected as shown below:

As requested in the Amendment dated September 10, 1970, please cancel the following:

Column 2, lines 3 and 4, after the word "transferring" in line three cancel --the bits in said register means, one each,--.

Signed and sealed this 21st day of December 1971.

(SEAL)
Attest:

EDWARD M.FLETCHER,JR.
Attesting Officer

ROBERT GOTTSCHALK
Acting Commissioner of Patents